US012748174B2

(12) United States Patent
Emani

(10) Patent No.: US 12,748,174 B2
(45) Date of Patent: Sep. 29, 2026

(54) CLASSIFYING ACCESS POINT BEACON COMMUNICATIONS USING MACHINE LEARNING

(71) Applicant: Silicon Laboratories Inc., Austin, TX (US)

(72) Inventor: Krishna Chaitanya Suryavenkata Emani, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 744 days.

(21) Appl. No.: 18/058,929

(22) Filed: Nov. 28, 2022

(65) Prior Publication Data

US 2024/0175970 A1 May 30, 2024

(51) Int. Cl.

*G01S 5/02* (2010.01)
*H04B 17/27* (2015.01)
*H04B 17/318* (2015.01)

(52) U.S. Cl.

CPC ............ *G01S 5/0252* (2013.01); *H04B 17/27* (2015.01); *H04B 17/318* (2015.01)

(58) Field of Classification Search

CPC .......... H04W 24/02; H04W 4/38; G06N 3/08; G06N 20/00; G06N 3/0464; G06N 3/044; G06N 7/01; G06N 3/047; G06N 20/20; G06N 3/02; G06N 5/022; G06N 3/082; G06N 3/049; G06N 5/02; G06N 3/126; G06N 3/0475; G06N 3/065

See application file for complete search history.

(56) References Cited

U.S. PATENT DOCUMENTS 8,655,307 B1 * 2/2014 Walker ................ H04W 68/005 455/574
9,516,053 B1 * 12/2016 Muddu ................ G06V 10/225
2024/0069144 A1 * 2/2024 Gao .................... G01S 5/02527

OTHER PUBLICATIONS

Cypress Embedded in Tomorrow, "Power Consumption Measurements," Doc. No. 002-14828 Rev. * B, May 3, 2017, p. 35.
Silicon Laboratories, "AN1280: RS911W Power Save Application Notes," silabs.com, Sep. 15, 2021, Version 1.4.
U.S. Appl. No. 17/839,597, filed Jun. 22, 2022, entitled "Providing a Hybrid Generic Attribute Database," in the name of Krishna Chaitanya Suryavenkata Emani, et al.
Weimann, Kuba, et al., "Transfer Learning for ECG Classification," Scientific Reports, Mar. 4, 2021, 12 pages.

* cited by examiner

*Primary Examiner* — Khalid W Shaheed
(74) *Attorney, Agent, or Firm* — Trop, Pruner & Hu, P.C.

(57) ABSTRACT

In one aspect, a method comprises: receiving, in a machine learning (ML) classifier, power plot information associated with communication between a wireless device and an access point; analyzing, in the ML classifier, the power plot information comprising determining whether an anomalous condition exists with respect to beacon communication between the wireless device and the access point; and in response to determining the anomalous condition, classifying a type of an anomalous beacon communication.

17 Claims, 8 Drawing Sheets

CLASSIFYING ACCESS POINT BEACON COMMUNICATIONS USING MACHINE LEARNING

BACKGROUND

Wireless communication such as Wi-Fi is pervasive in modern technology. Access points to which all manners of wireless devices connect range from very simple household access points to extremely high-quality corporate network access points. Quality of the components used in the access point are directly proportional to the overall cost and the lower the cost, the lower the quality of components.

Even when there is no active data transfer, wireless devices connected to an access point listen to beacons to stay connected. Standby power consumption is a critical measure for any Wi-Fi station, and beacon communication of an inferior access point can adversely affect power consumption of a station. Typical measurements of power consumption require significant manual intervention, which is not scalable.

SUMMARY OF THE INVENTION

In one aspect, a method comprises: receiving, in a machine learning (ML) classifier, power plot information associated with communication between a wireless device and an access point; analyzing, in the ML classifier, the power plot information comprising determining whether an anomalous condition exists with respect to beacon communication between the wireless device and the access point; and in response to determining the anomalous condition, classifying a type of an anomalous beacon communication.

In an implementation, the method further comprises storing, in an entry of a database, information regarding the anomalous beacon communication, the entry associated with the access point. The method may also include communicating information from the database to an integrated circuit designer for use in determining at least one configuration setting for an integrated circuit including radio frequency circuitry of the wireless device. The method may also include identifying the type of the anomalous beacon communication as one or more of a fat beacon or a drifted beacon.

In an embodiment, the method further comprises determining a configuration for the wireless device based at least in part on the type of anomalous beacon communication. The method may further include providing configuration information to the wireless device, the configuration information to cause a controller of the wireless device to control at least one setting of an analog front end circuit of the wireless device.

In an embodiment, analyzing the power plot information comprises: correlating a plurality of parameters of the power plot information to corresponding parameters of a trained model, the trained model based at least in part on a trained model for heartbeat classification. Analyzing the power plot information may include: determining a baseline current consumption of the wireless device during the standby mode; determining a current consumption of the wireless device during the beacon communication between the wireless device and the access point during the standby mode; and comparing at least one of the baseline current consumption and the current consumption to a modeled baseline current consumption and a modeled current consumption of a trained model.

In an embodiment, the method further comprises updating the trained model based on the power plot information when one or more of the baseline current consumption and the current consumption is below a corresponding threshold level. The method further comprises identifying the anomalous beacon communication in response to at least one of the baseline current consumption exceeding the modeled baseline current consumption by at least a first threshold amount or the current consumption exceeding the modeled current consumption by at least a second threshold amount.

In another aspect, a method comprises: configuring a wireless device to operate in a standby mode; in the standby mode, receiving a plurality of beacons from an access point in a wireless network with the wireless device; while the wireless device is in the standby mode, measuring a power consumption of the wireless device during a first duration; and providing the measured power consumption of the wireless device to a power analyzer to cause generation of power plot information of the power consumption and communication of the power plot information to a machine learning (ML) classifier.

In an embodiment, the method further comprises measuring the power consumption comprising an average power consumption of the wireless device during the first duration. Providing the measured power consumption of the wireless device comprises sending the measured power consumption to a controller of the wireless device, the controller to generate the power plot information. The method may further comprise classifying a type of the beacon communication in the ML classifier, the wireless device to execute the ML classifier. The method also may comprise updating at least one configuration setting for radio frequency circuitry of the wireless device based at least in part on the type of the beacon communication. The method further comprises sending the power plot information to a cloud-based storage comprising a database to store the power plot information in association with an identification of the access point. The method may further comprise sending identification information of the access point to the cloud-based storage, the identification information comprising a unique identifier and a firmware version.

In yet another aspect, a system comprises: transceiver circuitry to receive radio frequency (RF) signals, the RF signals comprising beacon communications from an access point; a power monitor coupled to the transceiver circuitry to measure a power consumption of the beacon communications during a first duration; a controller coupled to the power monitor, the controller to generate power plot information based on the measured power consumption; a ML classifier to identify whether an anomalous condition exists with respect to the beacon communications; and a configuration circuit coupled to the ML classifier. The configuration circuit may update at least one configuration setting of the transceiver circuitry in response to an identification of the anomalous condition.

In an embodiment, the ML classifier is to correlate one or more parameters of the power plot information to corresponding one or more parameters of a trained model, the trained model based at least in part on a trained model for heartbeat classification.

In an embodiment, the system is to send at least the power plot information to a cloud-based storage, the cloud-based storage to store the power plot information in association with an identification of the access point.

DETAILED DESCRIPTION

In various embodiments, machine learning such as via a deep neural network can be used to analyze power consumption information of wireless devices in communication with a given access point. In this way, a scalable solution results to enable an efficient manner of analyzing, e.g., power plot information of a wireless device's power consumption to highlight any abnormalities. Such artificial intelligence/machine learning-based analysis enables faster interpretation and use of information, instead of manually analyzing information to identify abnormalities. Embodiments may be performed in various locations, including lab environment-based equipment, cloud servers, and/or internally to one or more integrated circuits (ICs) of a wireless device itself.

Figure 1:
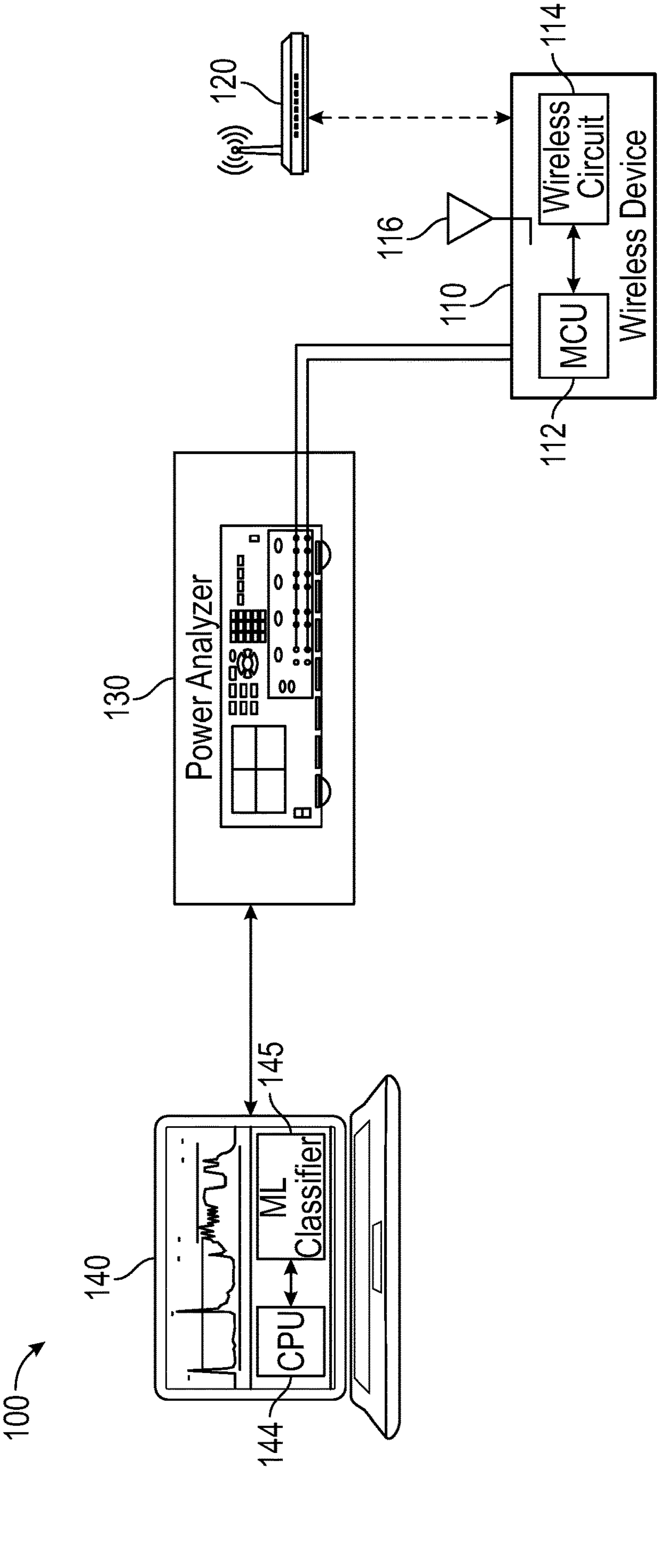
FIG. 1 is a block diagram of a test environment in accordance with an embodiment.

Referring now to FIG. 1, shown is a block diagram of a test environment in accordance with an embodiment. As shown in FIG. 1, test environment 100 may be located in a lab environment, e.g., of a designer and/or manufacturer of Internet of Things (IOT) ICs. In environment 100, a wireless network is provided to enable communications between an access point 120 and a wireless device 110.

With this arrangement, measurements regarding power consumption of wireless device 110, e.g., while in a low power mode such as a standby mode, can occur. As shown, wireless device 110 includes a microcontroller unit (MCU) 112 and a wireless circuit 114. In various embodiments, wireless circuit 114 may include, at least, transceiver circuitry having a transmitter to upconvert and transmit RF signals via an antenna 116 in an output direction and a receiver to receive and downconvert RF signals received via antenna 116. In some cases, a single IC may include MCU 112 and wireless circuit 114, while in other cases, these circuits may be adapted on different ICs.

With embodiments herein, access point 120 may communicate beacons to various devices present in the wireless network. For purposes of discussion herein, assume that wireless device 110 is controlled to operate in a standby mode. In this standby mode, wireless device 110 may periodically wake up, e.g., according to a time interval at which beacons are sent. In one example, beacons may be communicated according to a DTIM 1 protocol in which beacons are sent at an interval of approximately 102.4 milliseconds (ms) in the standby mode. Wireless device 110 causes multiple components, including wireless circuit 114 to be powered on to receive a beacon for each DTIM interval. The components are powered down once the beacon reception is completed. A total power consumption during standby mode may be directly proportionate to the time taken by each component in the receive signal processing path to turn on, decode the beacon and power off, along with the average current consumed in each phase.

As further illustrated in FIG. 1, wireless device 110 is coupled to a power analyzer 130 which may be configured to measure power consumption of wireless device 110 when in the standby mode. In one embodiment, power analyzer 130 may be a Keysight™ N6705 analyzer. Power analyzer 130 couples to a personal computer (PC) 140 that includes test software to control operation of this power consumption measurement and to receive the measured power consumption information from power analyzer 130.

In an embodiment, this measured power consumption information may be in the form of power plot information. As will be described further herein, PC 140 may be implemented as any type of client or server computing system that is to execute an ML classifier 145. ML classifier 145 is configured to analyze the power plot information to determine whether received beacons are acceptable (e.g., within tolerance, with respect to power consumption) or unacceptable. Details of this ML classifier 145, which may execute, e.g., on one or more CPUs 144 of PC 140, are described further below. Although shown at this high level in the embodiment of FIG. 1, many variations and alternatives are possible.

Figure 2:
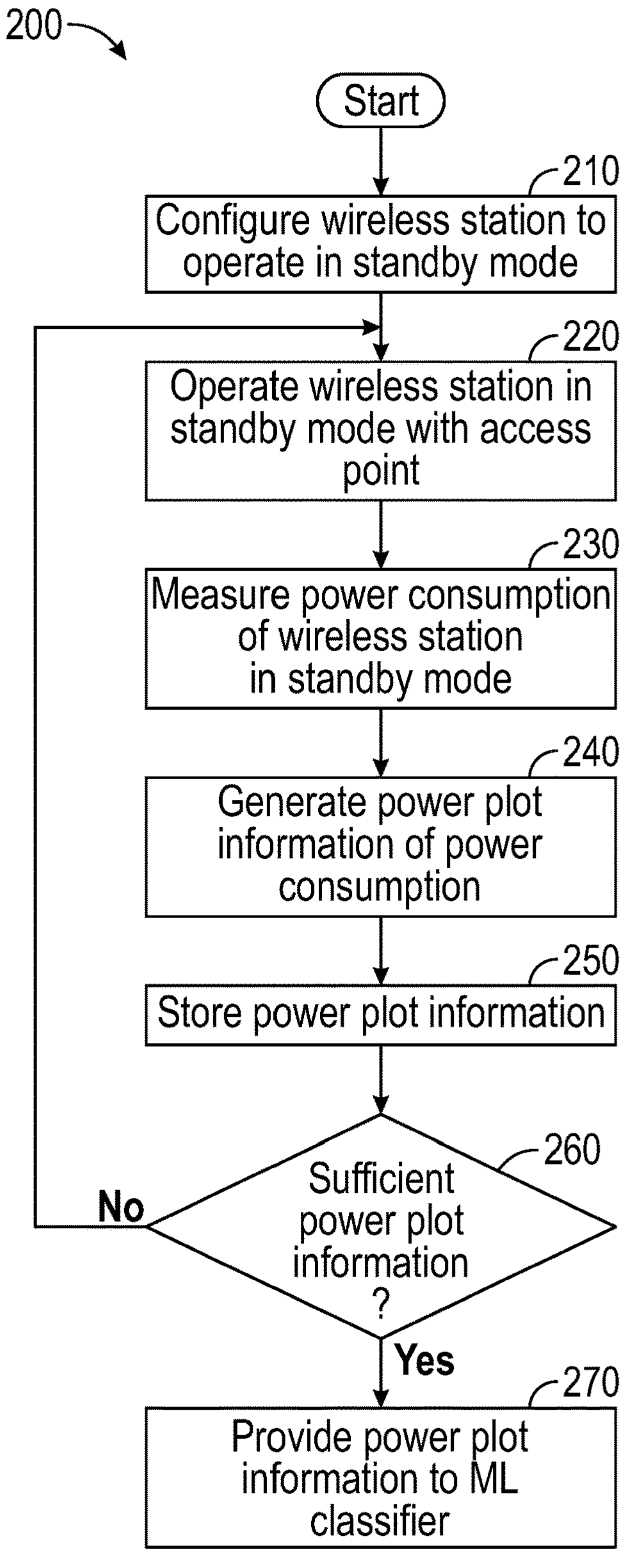
FIG. 2 is a flow diagram of a method in accordance with an embodiment.

Referring now to FIG. 2, shown is a flow diagram of a method in accordance with an embodiment. Method 200 is a method for monitoring power consumption of a wireless station within a wireless network. In one or more embodiments, method 200 may be performed by hardware circuitry, e.g., within a lab environment. This lab environment, as an example, includes at least one wireless device, an access point, a power meter such as a piece of lab equipment, and a connected PC, among other potential components. As such, method 200 may be performed by hardware circuitry alone, or in combination with firmware and/or software.

As illustrated, method 200 begins by configuring a wireless station to operate in a standby mode (block 210). For example, a given wireless station such as a smartphone, IoT device or so forth includes one or more ICs. At least one of the ICs has wireless functionality that may be placed into a standby mode, to reduce power consumption. This standby mode may be entered while the device is inactive with respect to an end user; however wireless circuitry of the wireless device may continue to be minimally active such as for receiving beacons transmitted by the access point according to a predetermined interval. Based on this configuration at block 220, the wireless station may operate in the standby mode and thus may receive communications from the access point such as the described beacons.

Still with reference to FIG. 2, control next passes to block 230 where power consumption of the wireless station may be measured while in this standby mode. In one embodiment, a power analyzer such as the Keysight™ N6705 analyzer discussed above may be used to measure the power consumption. From this power consumption measurement information, various metrics including an average power consumption (e.g., over a period of 1 to 5 minutes) can be determined, e.g., based on a key performance index selected. From the measured powered consumption, at block 240 power plot information may be generated. For example, sufficient power consumption information may be measured to generate such power plot information that identifies, e.g., in waveform form, power consumption of the wireless device during various aspects of a standby mode, such as periodically activating wireless circuitry to enable continued reception and detection of beacons from an access point. As examples, from this power plot information, various metrics can be analyzed, including, e.g., a baseline current, a current consumption of each beacon (which may be realized by breaking the beacon reception into multiple regions (preparation for beacon reception, RF turn on, actual beacon reception, RF turn off, etc.). At block 250 this power plot information may be stored. In different implementations, the information may be stored in a PC or a server (e.g., a local or cloud-based system).

Still referring to FIG. 2, next at diamond 260 it may be determined whether sufficient power plot information has been generated and stored. Although embodiments are not limited in this regard, power plot information for a given time duration, e.g., between approximately one and five minutes, may be a sufficient amount of data to enable analysis as described herein to be performed. When it is determined that sufficient power plot information has been obtained, control passes to block 270 where the power plot information may be provided to an ML classifier. For example, the power analyzer may send the power plot information to the PC or another computing device on which the ML classifier executes. For example, the data may be exported to a cloud-based system on which the ML classifier executes. Although shown at this high level in the embodiment of FIG. 2, understand that variations and alternatives are possible.

Figure 3:
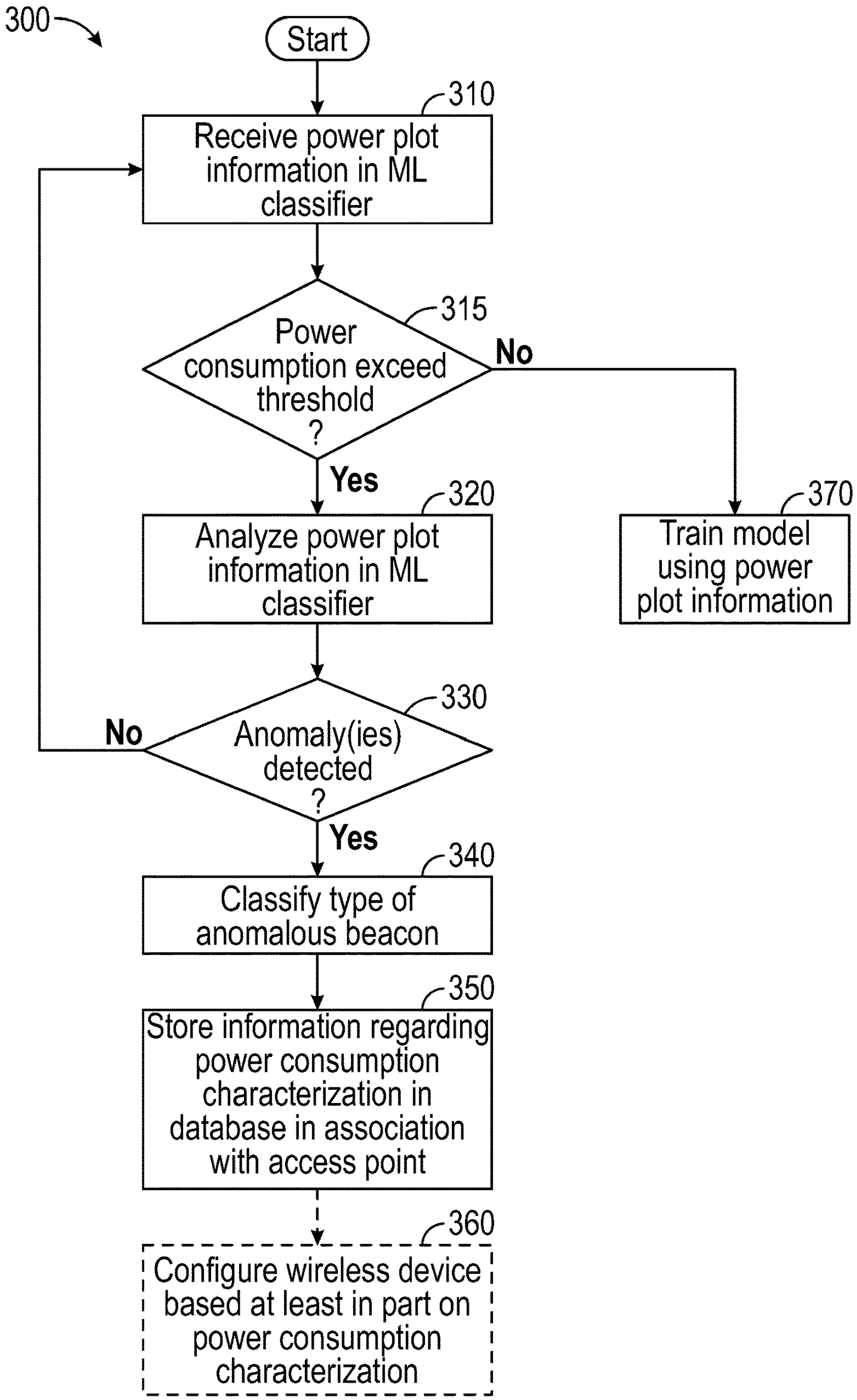
FIG. 3 is a flow diagram of a method in accordance with another embodiment.

Referring now to FIG. 3, shown is a flow diagram of a method in accordance with another embodiment. In FIG. 3, method 300 is a method for analyzing power consumption information of a wireless device and leveraging that information for various end uses. In an embodiment, method 300 may be performed by hardware circuitry, such as a computing device on which an ML classifier executes. In one or more embodiments, this ML classifier may execute, e.g., on a PC or other computing device. In some cases, the ML classifier may execute within the wireless device itself to enable dynamic monitoring of power consumption and providing of information, e.g., to a cloud-based destination and/or for optimizing operation of the wireless device.

As illustrated, method 300 begins by receiving power plot information in the ML classifier (block 310). This power plot information may be obtained using method 200 of FIG. 2. This power plot information is for a given wireless device in a wireless network in communication with at least one access point. For a given set of power plot information, it may be determined whether power consumption exceeds a threshold (diamond 315). If not, control passes to block 370, where the power plot information may be used to further train a model of the ML classifier. For example, this power plot information, when below such one or more thresholds, indicates that the wireless device incurs an acceptable level of power consumption in standby mode while processing beacon information. As such, the model may be further dynamically trained by labeling this power plot information as acceptable with respect to power consumption, thus providing additional samples to the ML classifier, indicating the range of power plot information that is acceptable.

Still with reference to FIG. 3, instead if the power consumption is determined to exceed such one or more thresholds, control passes to block 320 where the power plot information may be analyzed in the ML classifier. From this analysis, it may be determined whether one or more anomalies are detected with regard to the power plot information. To this end, the ML classifier may compare, e.g., graphically, the power plot information samples of a model to identify anomalies, e.g., with respect to power consumption excursions from acceptable threshold levels for different phases of beacon receipt and processing within a standby mode.

Still referring to FIG. 3, if it is determined that one or more anomalies are detected (at diamond 330), control passes to block 340 where a type of anomalous beacon can be classified. For example, depending upon parameters of the anomalies detected, the ML classifier may identify a fat beacon or other malformed beacon. Next, control passes to block 350 where information regarding a power consumption characterization may be stored. More specifically, information may be stored in a database that is maintained, e.g., in a cloud-based storage. As one example, for a given access point, one or more entries in the database may be generated, where an entry for this access point may include information regarding the power consumption characterization, and information about the access point such as its make, model, firmware version, channel, wireless technology, country of operation and so forth.

Still with reference to FIG. 3, understand that various use cases may be realized for the power consumption characterization. One use case is to optimize parameters for operating wireless devices that find themselves in the presence of the particular access point having, e.g., inferior quality and/or poor beacon fidelity (or so forth). To this end, as shown at optional block 360, the wireless device may be configured based at least in part on the power consumption characterization. For example, some corrective steps can be taken like adaptively adjusting the device wake up time for beacon reception or identifying idle medium time and shutting down the radio early, etc. in this way, beacon reception may be optimized while reducing power consumption, or sustaining network connection at the expense of higher power consumption.

These optimized settings may be used to appropriately configure the wireless device. For example, based on lab testing (and/or dynamic in-field testing), appropriate configuration settings may be generated and stored into wireless devices. In one such implementation, manufactured ICs may have fuses or other programmable storage written to enable setting of gain control, filter control, and/or other configuration settings in association with an access point identification. Thus, when such a wireless device is in a field situation and identifies an access point with which it is in communication, it may dynamically configure itself for optimal performance.

An additional use case for the access point information stored in the database may be to use it in developing protocols for better control of the access points themselves. The information also may be used in designing wireless devices to operate at reduced power consumption levels in the presence of lower quality access points. Information regarding an access point, including make and firmware version of the access point can help in designing work arounds for a wireless station when it identifies presence of the access point in the field. For example, the wireless station may be configured to identify the access point based on an Organizational Unique Identifier (OUI) of the access point. Understand while shown at this high level in the embodiment of FIG. 3, many variations and alternatives are possible. For example, sometimes even with higher consumption, sustaining the network connection is more important, and thus based on access point identification, the time of wake up for beacon reception can be adjusted adaptively.

Figure 4:
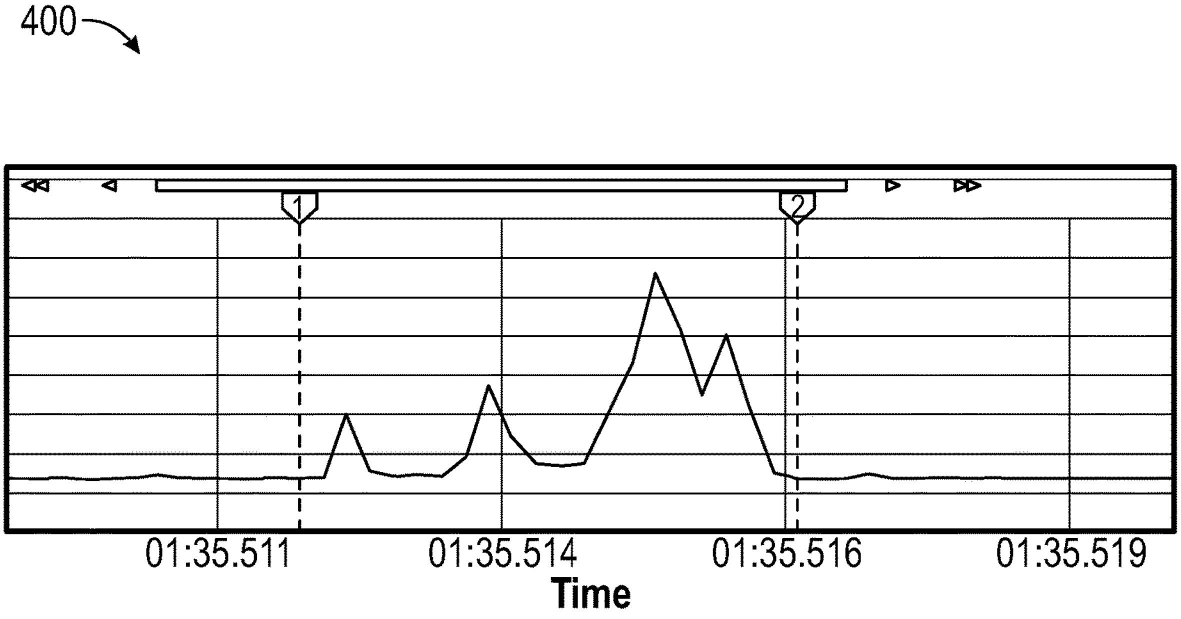
FIG. 4 is a graphical illustration of power plot information of a normal beacon.

Referring now to FIG. 4, shown is a graphical illustration of power plot information of a normal beacon. As illustrated in FIG. 4, power plot 400 illustrates graphically the current consumption of a normal beacon. As shown, the time taken by a receiver for receiving/decoding this beacon may be approximately 4.301 ms. As transceiver circuitry may be powered on only for this duration of time, a relatively low power consumption occurs and is within acceptable tolerances.

Figure 5:
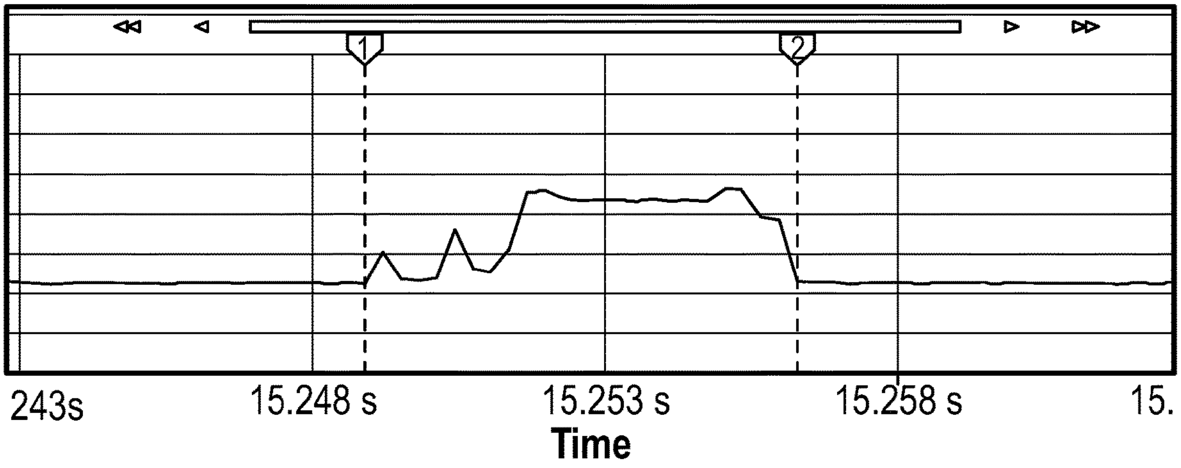
FIG. 5 is a graphical illustration of power plot information of an anomalous beacon.

Instead, other access points may communicate beacons that require longer durations for receiving and decoding. Referring now to FIG. 5, shown is a graphical illustration of power plot information of an anomalous beacon. As illustrated, this beacon, referred to as a fat beacon, causes higher power consumption due to the longer time incurred for beacon decoding. For example, in FIG. 5, the time taken for receiving/decoding the beacon is approximately 7.373 ms.

With embodiments, characteristics of the beacons, including an identification of a normal beacon, a fat beacon, and a drifted beacon, as examples, may be automatically identified using an ML classifier as described herein. In this way, access points having poorer beacon quality can be identified automatically, rather than requiring a trained user to manually zoom into individual beacons to uncover outliers. In addition to the power consumption metrics, additional information regarding beacon communications, such as time between beacons, may also be analyzed using an ML classifier in accordance with an embodiment.

Figure 6A:
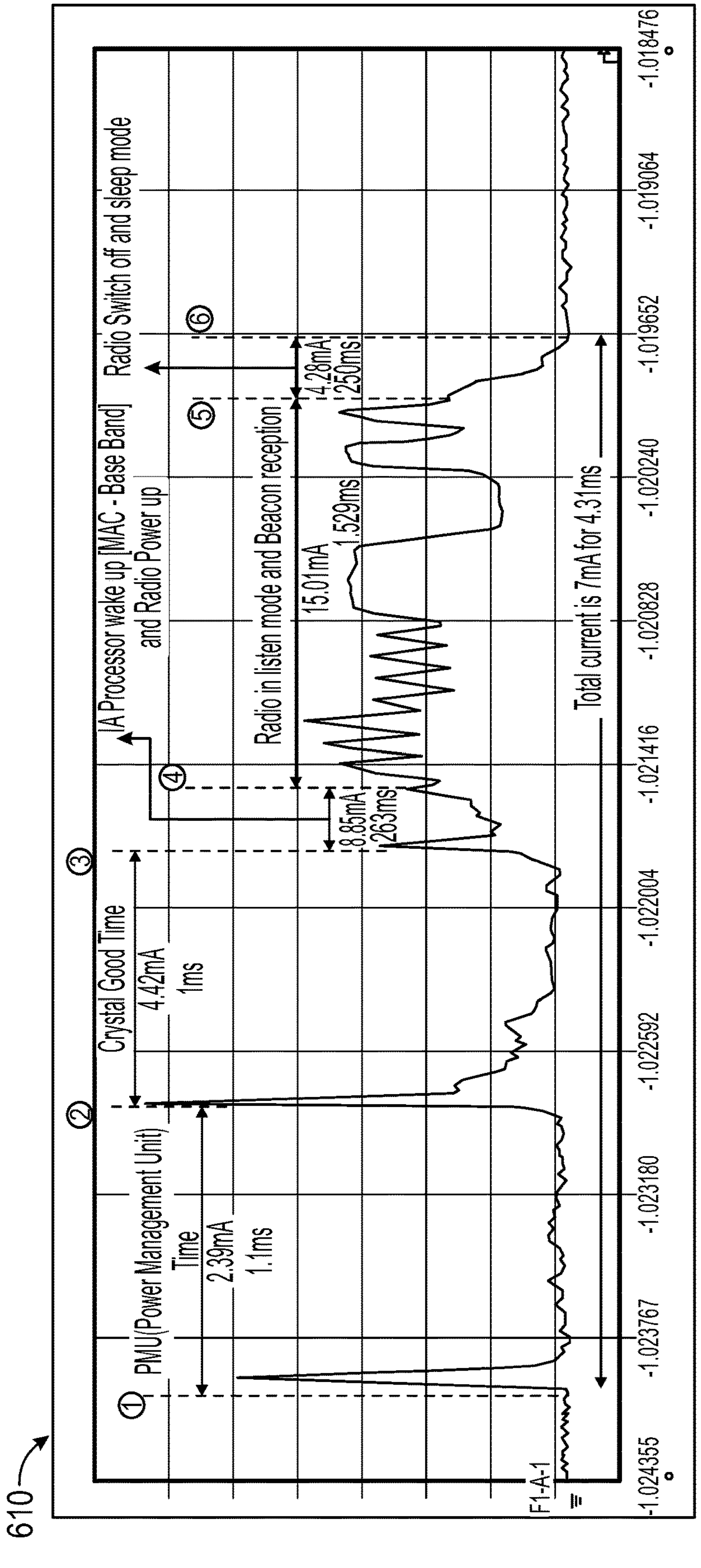
FIG. 6A is a graphical illustration of a zoomed in power consumption plot of a wireless device during receipt of a beacon.

Referring now to FIG. 6A, shown is a graphical illustration of a zoomed in power consumption plot of a wireless device during receipt of a beacon. As shown in FIG. 6A, graphical illustration 610 shows that there are several peaks in power consumption during beacon intervals, along with an additional period of relatively higher power consumption in which decoding operations occur. Thereafter, power consumption falls to a standby level.

Figure 6B:
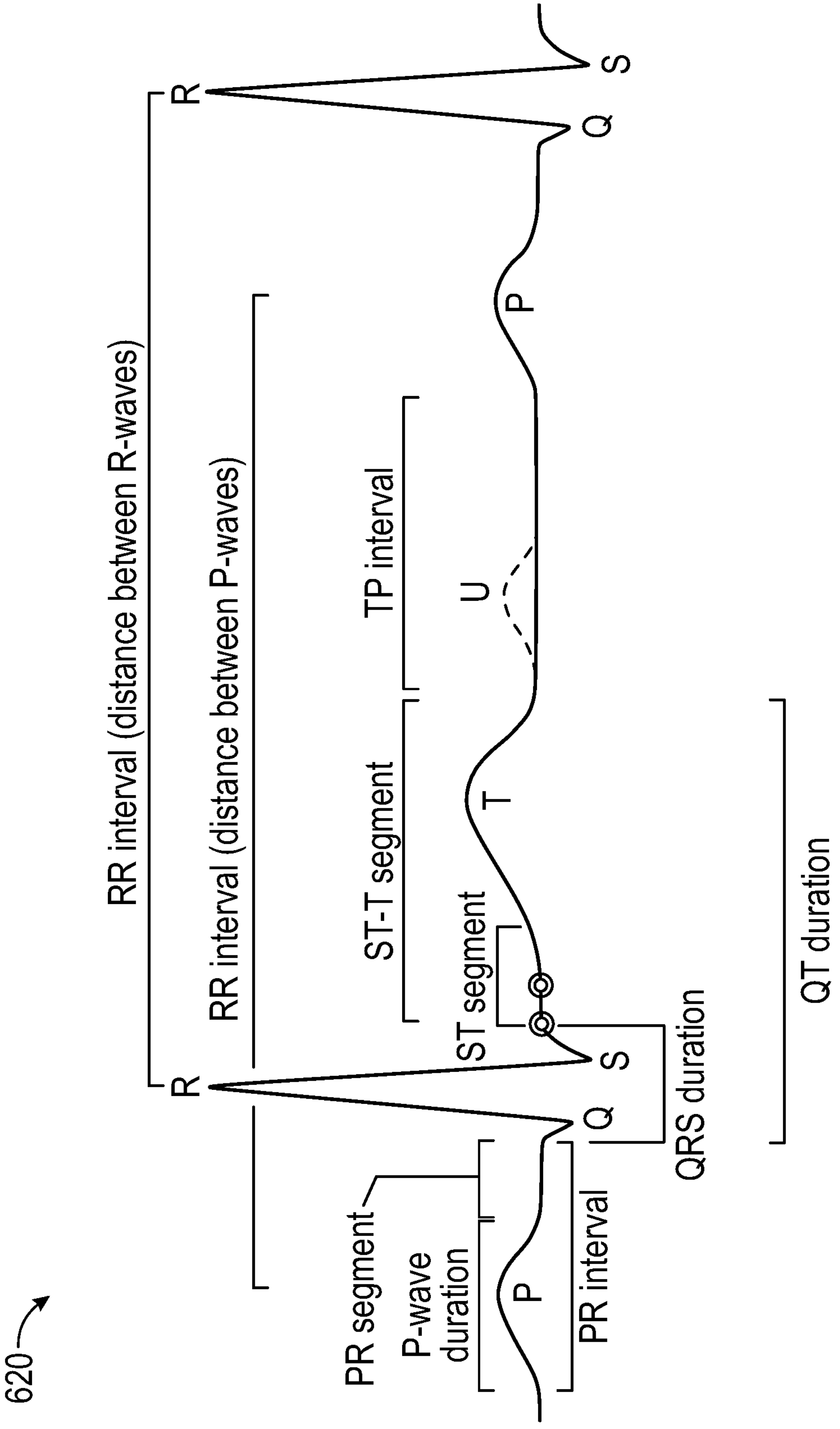
FIG. 6B is a graphical illustration of a zoomed in plot of an electrocardiogram of a single heartbeat.

As shown in FIG. 6B, which is a graphical illustration of a zoomed in plot of an electrocardiogram (ECG) of a single heartbeat, there is a very similar feature set between these two illustrations. That is, power consumption plots for beacon reception in a standby mode look very similar to an ECG plot. When a single beacon is zoomed in (as in FIG. 6A) and compared with a single heartbeat (as in FIG. 6B), observe a stark similarity between how these graphs can be segregated into different areas for pre-processing and feature extraction.

Given this similarity, embodiments may leverage the plethora of literature available on using deep neural networks and ML to classify ECG graphs in developing and training a model with beacons classified as good beacons vs. bad beacons (and where bad beacons may be further classified as, e.g., fat beacons, drifting beacons or missed beacons). Such embodiments may further be extended to any wireless technology for which power consumption measurements, e.g., in an idle state, are analyzed.

As such, one or more embodiments may leverage transfer learning to apply a trained model developed for ECG analysis to the power plot information analysis described herein. Of course, in other cases a standalone model may be trained by providing a training set of labeled power plot images of different types of beacons (e.g., normal beacons, drifted beacons or fat beacons).

Figure 7:
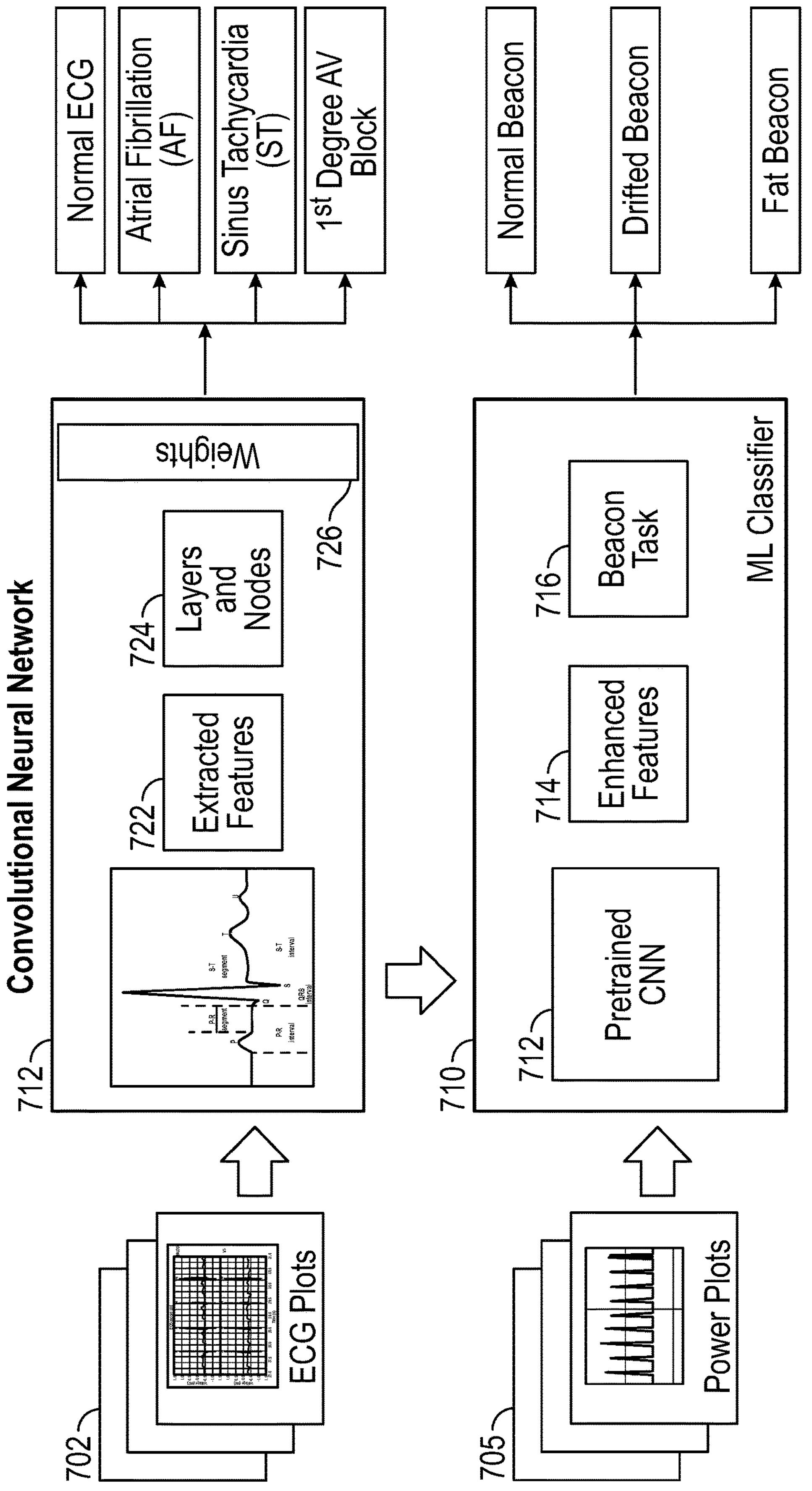
FIG. 7 is a block diagram of an ML classifier in accordance with an embodiment.

Referring now to FIG. 7, shown is a block diagram of an ML classifier in accordance with an embodiment. As shown in FIG. 7, ML classifier 710 may be implemented including a pretrained convolutional neural network (CNN) 712. In addition, ML classifier 710 includes enhanced features 714 as to amplitude of peaks in the power plot information. ML classifier 710 also includes a beacon task 716 which may leverage CNN 712 to identify various beacon types (e.g., normal, drifted and/or fat beacons) from a set of power plots 705, which may be received from a power analyzer such as shown above in FIG. 1.

Still with reference to FIG. 7, note that CNN 712 may be a trained model that was originally trained for analyzing ECG plots 702. As shown, CNN 712 may include extracted features 722 and a set of layers and nodes 724. In turn, resulting analyzed plots may be fed into a set of weights 726, the output of which can be used to identify various irregularities of a heartbeat. As shown, such irregularities may include identification of a normal heartbeat, atrial fibrillation, sinus tachycardia, and a first-degree AV blockage.

Figure 8:
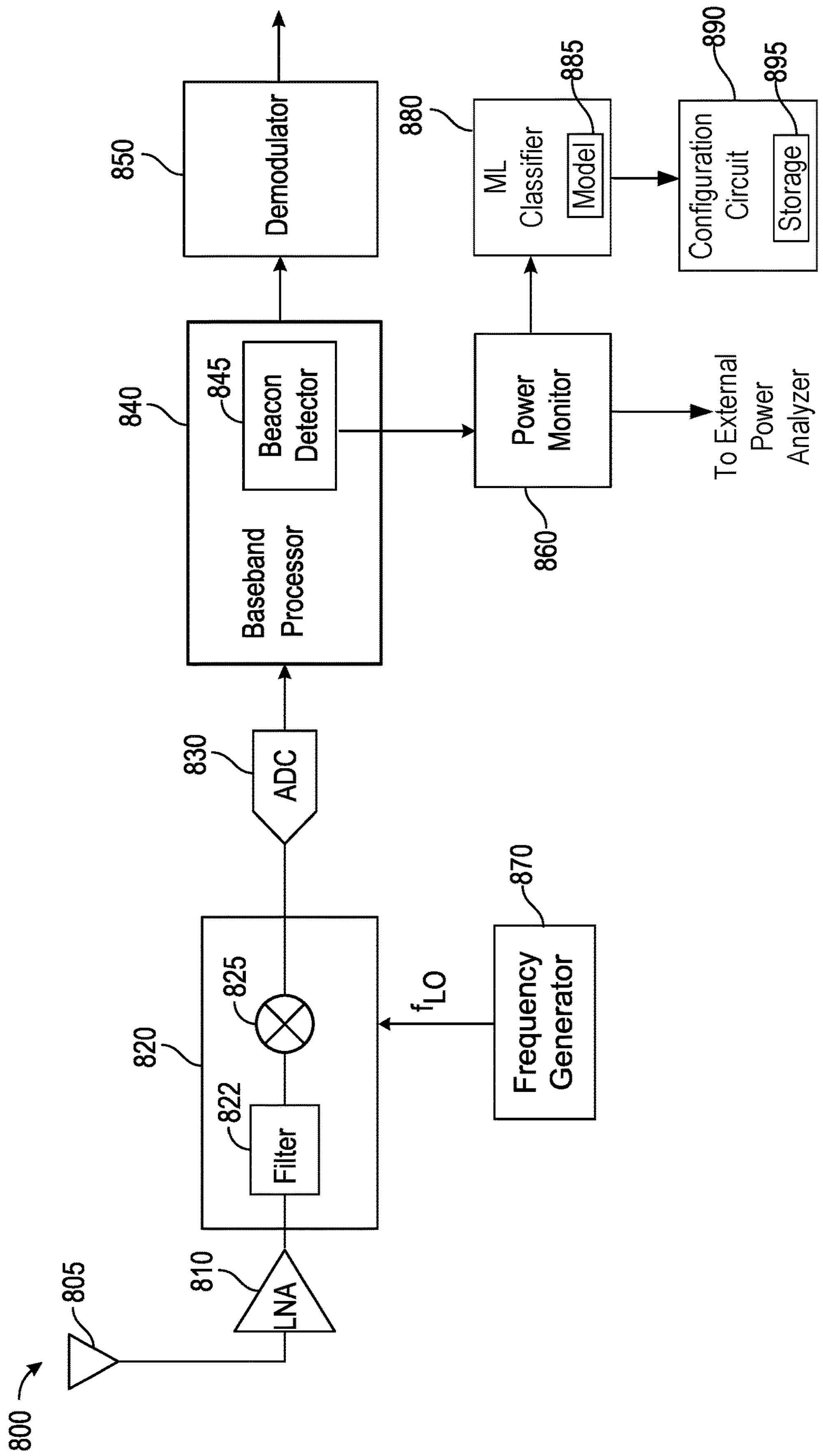
FIG. 8 is a block diagram of a receiver in accordance with an embodiment.

Referring now to FIG. 8, shown is a block diagram of a receiver in accordance with an embodiment. Receiver 800 may be implemented, in some cases, as a single semiconductor die receiver as included within an integrated circuit (IC). In such embodiments, all circuitry shown in FIG. 8 with the exception of an external antenna 805 may be implemented on the single semiconductor die.

In the embodiment shown, incoming radio frequency (RF) signals are received via antenna 805 and provided to a signal processing path including a low noise amplifier (LNA) 880. After appropriate amplification, the incoming RF signals are provided to an analog front end (AFE) circuit 820. In various implementations, AFE circuit 820 may include various filtering, gain circuitry and so forth, including an analog filter 822. AFE circuit 820 includes a mixer 825 configured to downconvert an RF signal to a lower frequency signal, e.g., an intermediate frequency (IF) signal such as a low-IF signal, zero IF signal, or other lower frequency signal.

To this end, mixer 825, which in some cases may be a complex mixer, is configured to downconvert the incoming RF signals using a mixing signal having a mixing frequency, shown as mixing signal ($f_{LO}$) received from a frequency generator 870. As one example, frequency generator 870 may be a local oscillator (LO) that may be implemented as a phase locked loop (PLL).

Still referring to the signal processing path of receiver 800, the downconverted signals output from AFE circuit 820 are provided to a digitizer, shown in FIG. 8 as an analog-to-digital converter (ADC) 830, which digitizes the signals. In turn, these digitized signals, which may be at baseband, are provided to a baseband processor 840. Although shown as a standalone baseband processor in the FIG. 8 embodiment, baseband processor 840 in some cases may be implemented within a digital signal processor (DSP).

After various baseband processing, including filtering, digital mixing, decimation and so forth, resulting baseband-processed signals may be provided to a demodulator 850 that demodulates these signals. In different implementations, one of a variety of demodulation schemes may be used. For purposes of discussion herein, assume that demodulator 850 is configured to perform orthogonal frequency division multiplexing (OFDM) demodulation. The resulting demodulated signals may be output from demodulator 850 and provided to further downstream processing circuitry, such as a digital processor (not shown for ease of illustration in FIG. 8).

As further shown in FIG. 8, baseband processor 840 includes a beacon detector 845, which may identify incoming beacons. In turn, beacon detector 845 may trigger a power monitor 860 to maintain power consumption information regarding an incoming beacon stream. The resulting power consumption information, which may be processed to be placed into power plot information form as described herein, is provided to a ML classifier 880, which in turn uses a model 885 to classify incoming beacons.

Information regarding beacon types can be sent to various destinations, including to a cloud-based destination. In addition, the information is provided to a configuration circuit 890, which may include a storage 895 having various entries for access points, which when a given access point is identified, can provide configuration setting information such as adaptively adjusting wake up times for beacon reception, powering down radio circuitry, or other corrective steps.

Although ML classifier 880 is shown as a separate component in FIG. 8, it is possible in some implementations to implement it within a baseband processor (or as part of a DSP in some implementations). In any event, ML classifier 880 may execute on either dedicated or programmable hardware circuitry. To this end, ML classifier 880 may include or be coupled to a non-volatile storage or other non-transitory storage medium to store instructions and data usable for performing beacon classification as described herein.

Furthermore, understand while in the embodiment of FIG. 8, only a receiver signal processing path is shown for ease of illustration, such receiver may be part of a wireless transceiver further including transmit capabilities. Understand that while shown at this high level in the embodiment of FIG. 8, many variations and alternatives are possible.

Embodiments that use ML/AI for power consumption characterization across access points can dramatically reduce manual verification (which is not scalable) of beacons to identify outliers. Embodiments may further cause generation of a massive database of access point vs. beacon characteristics. This information may be used to develop intelligent solutions to cause wireless devices to dynamically adapt configuration settings, based at least in part on a detected beacon pattern. Such dynamic reconfiguration may help reduce power consumption in a standby mode or avoid disconnections to the network even if there is a compromise on power consumption as a tradeoff.

To this end, wireless devices in accordance with an embodiment may be configured to measure beacon and other characteristics of every access point the device is connected to and share the information. For example, the wireless device may be configured to perform the ML classification described herein, and communicate resulting information to a cloud-based storage along with the access point information. In this way, a database of access point characteristics can be expanded, allowing an enormous amount of data to be mined to identify access points with abnormal behavior and determining an adaptive solution for wireless devices that come in contact with such access points. In this way, wireless disconnections may be reduced and reliability of wireless devices may increase.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A computer readable medium comprising instructions that, when executed, cause a system to perform a method comprising:

receiving, in a machine learning (ML) classifier, power plot information associated with communication between a wireless device and an access point;

analyzing, in the ML classifier, the power plot information comprising determining whether an anomalous condition exists with respect to beacon communication between the wireless device and the access point; and in response to determining the anomalous condition, classifying a type of the anomalous beacon communication comprising identifying the type of the anomalous beacon communication as one or more of a fat beacon or a drifted beacon and determining a configuration for the wireless device based at least in part on the type of the anomalous beacon communication.

2. The computer readable medium of claim 1, wherein the method further comprises storing, in an entry of a database, information regarding the anomalous beacon communication, the entry associated with the access point.

3. The computer readable medium of claim 2, wherein the method further comprises communicating information from the database to an integrated circuit designer for use in determining at least one configuration setting for an integrated circuit including radio frequency circuitry of the wireless device.

4. The computer readable medium of claim 1, wherein the method further comprises providing configuration information to the wireless device, the configuration information to cause a controller of the wireless device to control at least one setting of an analog front end circuit of the wireless device.

5. The computer readable medium of claim 1, wherein analyzing the power plot information comprises:

correlating a plurality of parameters of the power plot information to corresponding parameters of a trained model, the trained model based at least in part on a trained model for heartbeat classification.

6. The computer readable medium of claim 1, wherein analyzing the power plot information comprises:

determining a baseline current consumption of the wireless device during a standby mode;

determining a current consumption of the wireless device during the beacon communication between the wireless device and the access point during the standby mode; and comparing at least one of the baseline current consumption and the current consumption to a modeled baseline current consumption and a modeled current consumption of a trained model.

7. The computer readable medium of claim 6, wherein the method further comprises updating the trained model based on the power plot information when one or more of the baseline current consumption and the current consumption is below a corresponding threshold level.

8. The computer readable medium of claim 6, wherein the method further comprises identifying the anomalous beacon communication in response to at least one of the baseline current consumption exceeding the modeled baseline current consumption by at least a first threshold amount or the current consumption exceeding the modeled current consumption by at least a second threshold amount.

9. A method comprising:

configuring a wireless device to operate in a standby mode;

in the standby mode, receiving a plurality of beacons from an access point in a wireless network with the wireless device;

while the wireless device is in the standby mode, measuring a power consumption of the wireless device during a first duration;

providing the measured power consumption of the wireless device to a power analyzer, comprising sending the measured power consumption to a controller of the wireless device to cause generation of power plot information of the power consumption and communication of the power plot information to a machine learning (ML) classifier, the controller to generate the power plot information; and classifying a type of beacon communication in the ML classifier, the wireless device to execute the ML classifier.

10. The method of claim 9, further comprising measuring the power consumption comprising an average power consumption of the wireless device during the first duration.

11. The method of claim 9, further comprising updating at least one configuration setting for radio frequency circuitry of the wireless device based at least in part on the type of beacon communication.

12. The method of claim 9, further comprising sending the power plot information to a cloud-based storage comprising a database to store the power plot information in association with an identification of the access point.

13. The method of claim 12, further comprising sending identification information of the access point to the cloud-based storage, the identification information comprising a unique identifier and a firmware version.

14. A method comprising:

receiving, in a machine learning (ML) classifier, power plot information associated with a power consumption level of a wireless device during beacon communication between the wireless device and an access point, the power plot information comprising power consumption information of the wireless device for a plurality of components of a standby mode in which the beacon communication comprises a plurality of beacons sent by the access point;

analyzing, in the ML classifier, the power plot information comprising determining whether an anomalous condition exists with respect to the beacon communication; and in response to determining the anomalous condition, classifying a type of the anomalous condition.

15. The method of claim 14, further comprising communicating information regarding the anomalous condition to an integrated circuit designer for use in determining at least one configuration setting for an integrated circuit including radio frequency circuitry of the wireless device.

16. The method of claim 14, further comprising based at least in part on the anomalous condition, providing configuration information to the wireless device, the configuration information to cause a controller of the wireless device to control at least one setting of an analog front end circuit of the wireless device.

17. The method of claim 14, further comprising determining a configuration for the wireless device based at least in part on the type of the anomalous condition.

* * * * *